(12) United States Patent
Nobayashi

(10) Patent No.: US 7,712,909 B2
(45) Date of Patent: May 11, 2010

(54) ROTATING LAMP

(75) Inventor: Isao Nobayashi, Osaka (JP)

(73) Assignee: Arrow Co., Ltd., Osaka (JP)

( * ) Notice: Subject to any disclaimer, the term of this patent is extended or adjusted under 35 U.S.C. 154(b) by 182 days.

(21) Appl. No.: 11/911,328

(22) PCT Filed: Feb. 21, 2006

(86) PCT No.: PCT/JP2006/303004

§ 371 (c)(1),
(2), (4) Date: Oct. 11, 2007

(87) PCT Pub. No.: WO2006/112132

PCT Pub. Date: Oct. 26, 2006

(65) Prior Publication Data

US 2009/0091914 A1    Apr. 9, 2009

(30) Foreign Application Priority Data

Apr. 14, 2005  (JP) .............................. 2005-116560

(51) Int. Cl.
*F21V 21/30* (2006.01)

(52) U.S. Cl. .................... 362/35; 362/277; 362/284; 362/296.01

(58) Field of Classification Search .............. 362/35, 362/269, 271, 277, 284–285, 296.01, 545
See application file for complete search history.

(56) References Cited

U.S. PATENT DOCUMENTS 5,929,788 A    7/1999  Vukosic 6,183,100 B1    2/2001  Suckow et al.
2002/0041499 A1    4/2002  Pederson

FOREIGN PATENT DOCUMENTS

| DE | 203 17 373 U1 | 1/2004 |
|---|---|---|
| EP | 1 439 120 | 7/2004 |
| GB | 2 260 397 | 4/1993 |
| JP | 55-146603 | 10/1980 |
| JP | 58-30025 | 2/1983 |
| JP | 2-96018 | 7/1990 |
| JP | 2002-163903 | 6/2002 |
| JP | 2004-296245 | 10/2004 |
| WO | WO 2005/121637 | 12/2005 |

OTHER PUBLICATIONS

International search Report, PCT/JP2006/303004, mailed May 23, 2006.
Extended European Search Report, 05026112.2, mailed Apr. 3, 2006.

*Primary Examiner*—Sandra L O'Shea
*Assistant Examiner*—Meghan K Dunwiddie
(74) *Attorney, Agent, or Firm*—Ditthavong Mori & Steiner, P.C.

(57) ABSTRACT

A rotating lamp comprises a translucent globe, a shaft portion, arranged in the globe, made of a material containing metal, an LED device provided on the shaft portion, a rotatable support member rotatably set along the outer peripheral direction of the shaft portion, a reflecting mirror supported by the rotatable support member for reflecting light received from the LED device, a driving portion rotating/driving the rotatable support member and a heat radiating portion provided on the shaft portion. Thus, heat generated in LED devices can be discharged and a problem resulting from heat can be solved.

12 Claims, 17 Drawing Sheets

ROTATING LAMP

TECHNICAL FIELD

The present invention relates to a rotating lamp comprising an LED (light-emitting diode) device serving as a light source.

BACKGROUND ART

A rotating lamp employing an incandescent lamp for a light source is known in general. However, the rotating lamp employing an incandescent lamp is disadvantageously burned out in a short period, consumes high power and requires much labor for maintenance/management.

Therefore, an LED device has recently been increasingly employed as the light source for a rotating lamp. For example, Japanese Patent Laying-Open No. 2002-163903 (Patent Document 1) describes an exemplary rotating lamp employing LED devices as a light source.

In the rotating lamp described in Japanese Patent Laying-Open No. 2002-163903, a plurality of LED devices are radially arranged on the upper and lower surfaces of a discoidal holder for forming a light source, and a rotating tapered annular reflector is provided around this light source.

Patent Document 1: Japanese Patent Laying-Open No. 2002-163903

DISCLOSURE OF THE INVENTION

Problems to be Solved by the Invention

In the rotating lamp described in the aforementioned patent literature, however, heat generated from the LED devices is so hardly discharged that the LED devices reach a high temperature. While the LED devices comprise LEDs mounted on wiring patterns and elements such as wires connecting the LEDs and the wiring patterns with each other, for example, the wires and the LEDs may be disadvantageously disconnected from each other when the temperature of the LED devices is increased, to disadvantageously deteriorate the performance and reliability of the LED devices serving as the light source or reduce the lives of the LED devices.

The present invention has been proposed in order to solve the aforementioned problem and an object of the present invention is to provide a rotating lamp capable of solving a problem resulting from heat generated in an LED device.

Means for Solving the Problems

The rotating lamp according to the present invention comprises a translucent globe, an LED device arranged in the globe for serving as a light source, a shaft portion on which the LED device is set, a reflecting mirror rotatably set along the outer peripheral direction of the shaft portion for reflecting light received from the LED device, a driving portion rotating/driving the reflecting mirror and a heat radiating portion provided on the shaft portion.

The rotating lamp according to the present invention preferably further comprises a rotatable support member rotatably set on the outer periphery of the shaft portion for supporting the aforementioned reflecting mirror and a support plate supporting the rotatable support member and the shaft portion. In this case, the shaft portion and the support plate are preferably made of a material containing metal.

The heat radiating portion is preferably arranged upward beyond a part of the aforementioned shaft portion mounted with the LED device. When the shaft portion extends from the bottom to the top of the reflecting mirror, for example, the heat radiating portion may be arranged to reach a region located upward beyond the reflecting mirror. Further, the thickness of a region of the shaft portion located between a first part mounted with the LED device and a second part provided with the heat radiating portion is preferably larger than the thickness of another region of the shaft portion located downward beyond the aforementioned first part.

The aforementioned reflecting mirror may be provided with a notch for receiving the heat radiating portion in this notch. Further, the shaft portion may be hollowed for storing a lead wire supplying power to the LED device in this shaft portion.

The aforementioned shaft portion may have a flange on one end thereof. In this case, the flange is preferably fixed to the upper wall of the globe, and the aforementioned heat radiating portion is preferably arranged upward beyond a part of the shaft portion mounted with the LED device. The aforementioned flange and the shaft portion are preferably made of a material containing metal.

The aforementioned heat radiating portion may be integrally formed by the same member as the shaft portion, or may be formed by a member independent of the shaft portion. This radiating portion preferably has a plurality of radiation fins set on the outer periphery of the shaft portion to radially extend outward from the shaft portion.

Effects Of The Invention

According to the present invention, heat generated in LED devices can be dissipated outward through a heat radiating portion provided on a shaft portion. Thus, a problem resulting from the heat generated from the LED devices can be solved.

DESCRIPTION OF THE REFERENCE SIGNS

1 LED device, 2 printed board, 3 shaft portion, 4 chassis, 5 heat radiating portion, 6, 60 reflecting mirror, 7 reflecting mirror mounting portion, 8 main gear, 9 intermediate gear, 10 pinion, 11 motor, 12 globe, 13 body casing, 14 driving portion, 15 support shaft portion, 16 fixtures, 17 rotatable support member, 18 notch, 19 support portions, 20 support wall portion, 21 screws, 50 rotating lamp.

BEST MODES FOR CARRYING OUT THE INVENTION

Embodiments of the present invention are now described with reference to FIGS. 1 to 20.

First Embodiment

Figure 1:
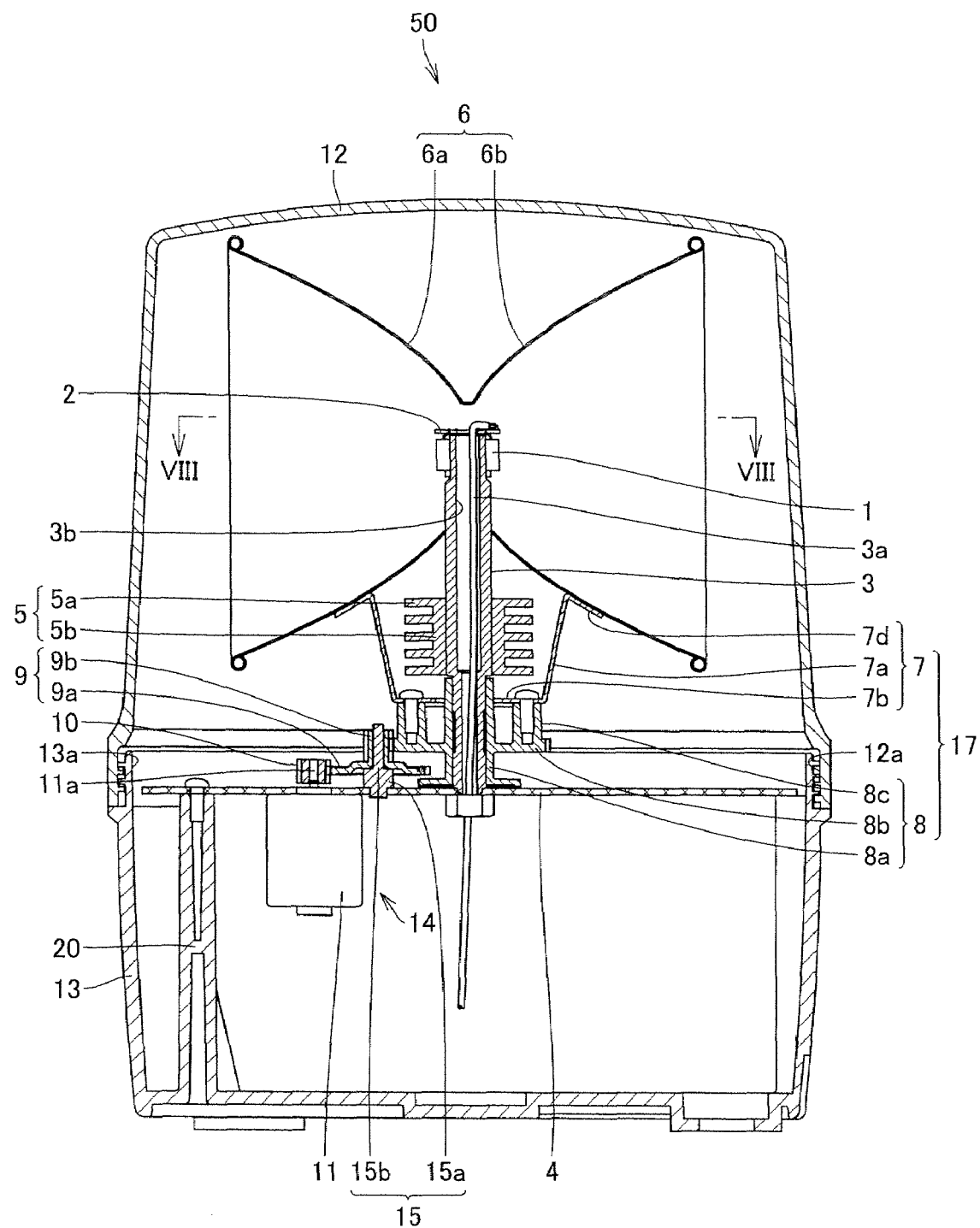
FIG. 1 a sectional view of a rotating lamp according to a first embodiment of the present invention.

FIG. 1 is a sectional view of a rotating lamp 50 according to a first embodiment of the present invention. As shown in FIG. 1, the rotating lamp 50 comprises a translucent globe 12, a shaft portion (tubular member) 3 arranged in the globe 12, a plurality of LED devices 1 provided on the shaft portion 3, a reflecting mirror 6 reflecting light received from the LED devices 1, a driving portion 14 rotating/driving the reflecting mirror 6 and a heat radiating portion 5 provided on the shaft portion 3.

The globe 12 is formed by an upper wall and a hollow cylindrical side wall (outer peripheral wall) having an opening 12a on the lower end thereof. A thread part is formed on the inner peripheral surface of the opening 12a of the globe 12. A body casing (substrate) 13 formed by a bottom wall and a hollow cylindrical side wall (outer peripheral wall) having an opening 13a on the upper end thereof is arranged on the lower side of the globe 12. This body casing 13 stores various elements including part of the driving portion 14.

Another thread part is formed on the outer peripheral surface of the opening 13a of the body casing 13 to be fitted with the thread part formed on the opening 12a of the globe 12 for coupling the globe 12 and the body casing 13 with each other. The body casing 13 is formed with a support wall portion 20 projecting from the bottom surface toward the opening 13a, so that a chassis (support plate) 4 is fixed to the upper end of this support wall portion 20.

The chassis 4 is in the form of a circular flat plate and arranged around the joint between the globe 12 and the body casing 13. This chassis 4, supporting a rotatable support member 17 and the shaft portion 3, is made of a material containing metal, for example. When made of a material having excellent heat conductivity such as metal or a composite material of metal and another material, the chassis 4 can serve as a heat radiating member. The shaft portion 3 is arranged on the center of the upper surface of the chassis 4, while the rotatable support member 17 is arranged also on the upper surface of the chassis 4 around the shaft portion 3.

The driving portion 14 is also set on the chassis 4. The driving portion 14 includes a motor 11 and an intermediate gear 9. The motor is set on lower surface of the chassis 4. A driving shaft 11a of the motor 11 projects upward from the lower surface of the chassis 4, and a pinion 10 is mounted on the upper end of the driving shaft 11a. The pinion 10 meshes with a plurality of teeth formed on a discoidal portion 9a of the intermediate gear 9. A support shaft portion 15 provided in the vicinity of the shaft portion 3 and fixed to the chassis 4 rotatably supports the intermediate gear 9. This intermediate gear 9 includes the discoidal portion 9a and a cylindrical portion 9b formed on the upper surface of the discoidal portion 9a. The discoidal portion 9a is formed with the plurality of teeth on the outer periphery thereof, while the cylindrical portion 9b is also formed with a plurality of teeth on the outer periphery thereof. The support shaft portion 15 includes a large diametral part 15a and a small diametral part 15b provided on this large diametral part 15a to project upward. Therefore, the support shaft portion 15 has a halfway step resulting from the small diametral part 15b and the large diametral part 15a. The intermediate gear 9 is placed on this step of the support shaft portion 15.

The shaft portion 3 is uprightly set on the upper surface of the chassis 4. This shaft portion 3 is made of a material having a high heat transfer coefficient such as a material containing metal, for example. More specifically, the shaft portion 3 can be made of copper, aluminum or an alloy thereof. When made of aluminum, the shaft portion 3 can be reduced in weight while maintaining a high heat transfer coefficient. The aforementioned chassis 4 can be made of the same material as the shaft portion 3.

A printed board 2 is arranged on the upper end of the shaft portion 3. The plurality of LED devices 1 are provided on the upper peripheral surface of the shaft portion 3 around the printed board 2 along the circumferential direction of the shaft portion 3.

A through hole 3b extending from the upper end to the lower end of the shaft portion 3 is formed in the shaft portion 3, so that wires (lead wires) 3a are provided in this through hole 3b for supplying power to the LED devices 1. The wires 3a connect a power supply source (not shown) and the printed board 2 with each other, for supplying power from the power supply source to the LED devices 1 through the printed board 2.

The aforementioned rotatable support member 17 is set on the base of the shaft portion 3. The rotatable support member 17 is mounted on the outer periphery of the shaft portion 3 to be rotatable along the outer peripheral direction of the shaft portion 3. This rotatable support member 17 supports the reflecting mirror 6, so that the driving portion 14 rotates/drives the rotatable support member 17 thereby rotating/driving the reflecting mirror 6 along with the rotatable support member 17.

The rotatable support member 17 includes a main gear 8 rotatable about the shaft portion 3 and a reflecting mirror mounting portion 7 arranged on the upper surface of the main gear 8. The main gear 8 includes a cylindrical portion 8a, a discoidal portion 8b and a mounting portion 8c. The cylindrical portion 8a, provided on the center of the main gear 8, is set on the outer peripheral surface of the shaft portion 3. The discoidal portion 8b, provided on a halfway part of the cylindrical portion 8a, is formed with teeth meshing with those formed on the cylindrical portion 9b of the intermediate gear 9. The mounting portion 8c for fixing the reflecting mirror mounting portion 7 is uprightly provided on the upper surface of the discoidal portion 8b. The reflecting mirror mounting portion 7 is fixed to the mounting portion 8c with screws. This reflecting mirror mounting portion 7 includes a pair of opposite side walls 7a, a bottom wall 7b and bent parts 7d formed on the upper ends of the side walls 7a. The reflecting mirror 6 is fixed to the bent parts 7d.

The reflecting mirror 6, provided in the form of a cylinder, is transversely arranged. This reflecting mirror 6 is formed by combining a pair of enlarged diametral parts 6a and 6b gradually enlarged in diameter from the center toward both ends with each other. According to the first embodiment, curved regions of the enlarged diametral parts 6a and 6b have substantially parabolic sections and substantially parabolic inner surfaces.

The shaft portion 3 is arranged to pass through the center of the bottom wall of the reflecting mirror 6 from below and project into the reflecting mirror 6. According to the first embodiment, the forward end of the shaft portion 3 is arranged at the center of the reflecting mirror 6. The LED devices 1 are mounted on the forward end of the shaft portion 3. These LED devices 1 are arranged in the vicinity of the focal point of the reflecting mirror 6. When parallel beams are incident upon the reflecting mirror 6 through its opening, light reflected by the reflecting mirror 6 converges on this focal point of the reflecting mirror 6.

The heat radiating portion 5 is arranged inside the reflecting mirror mounting portion 7. According to the first embodiment, the heat radiating portion 5 is constituted of a member independent of the shaft portion 3, and fixed to the shaft portion 3. This heat radiating portion 5 includes the cylindrical portion 5b and a plurality of radiation fins 5a arranged in the axial direction of the shaft portion 3 at intervals to extend outward from the cylindrical portion 5b. The cylindrical portion 5b can be attached to the outer peripheral surface of the shaft portion 3 through an adhesive or the like. The radiation fins 5a are in the form of discs.

The heat radiating portion 5, constituted of the member independent of the shaft portion 3 according to the first embodiment, may alternatively be formed integrally with the shaft portion 3. The heat radiating portion 5 provided around the shaft portion 3 reinforces the shaft portion 3. Therefore, the shaft portion 3 is hardly deformed, so that the rotatable support member 17 can be stably rotated/driven.

Figure 2:
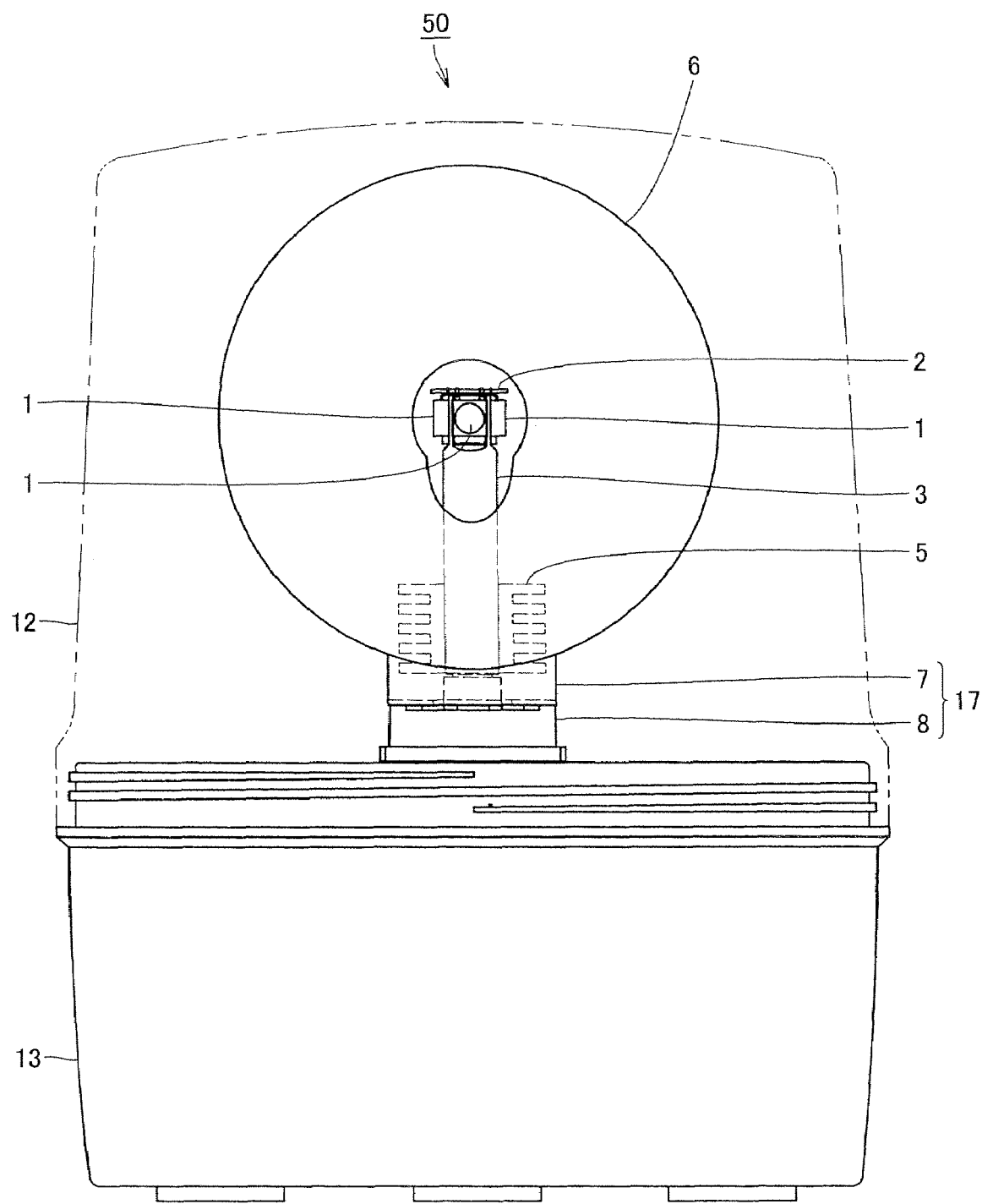
FIG. 2 is a front elevational view of the rotating lamp according to the first embodiment of the present invention.

FIG. 2 is a front elevational view of the rotating lamp as viewed from the opening of the reflecting mirror 6. As shown in FIG. 2, the heat radiating portion 5 provided on the shaft portion 3 is arranged on a position screened by the reflecting mirror 6 as viewed from the opening of the reflecting mirror 6. This heat radiating portion 5 is arranged on a vertical position where the lower ends of openings of the enlarged diametral parts 6a and 6b and the lower end of the heat radiating portion 5 are substantially flush with each other. The LED devices 1 are arranged substantially at the center of the opening of the reflecting mirror 6.

Figure 3:
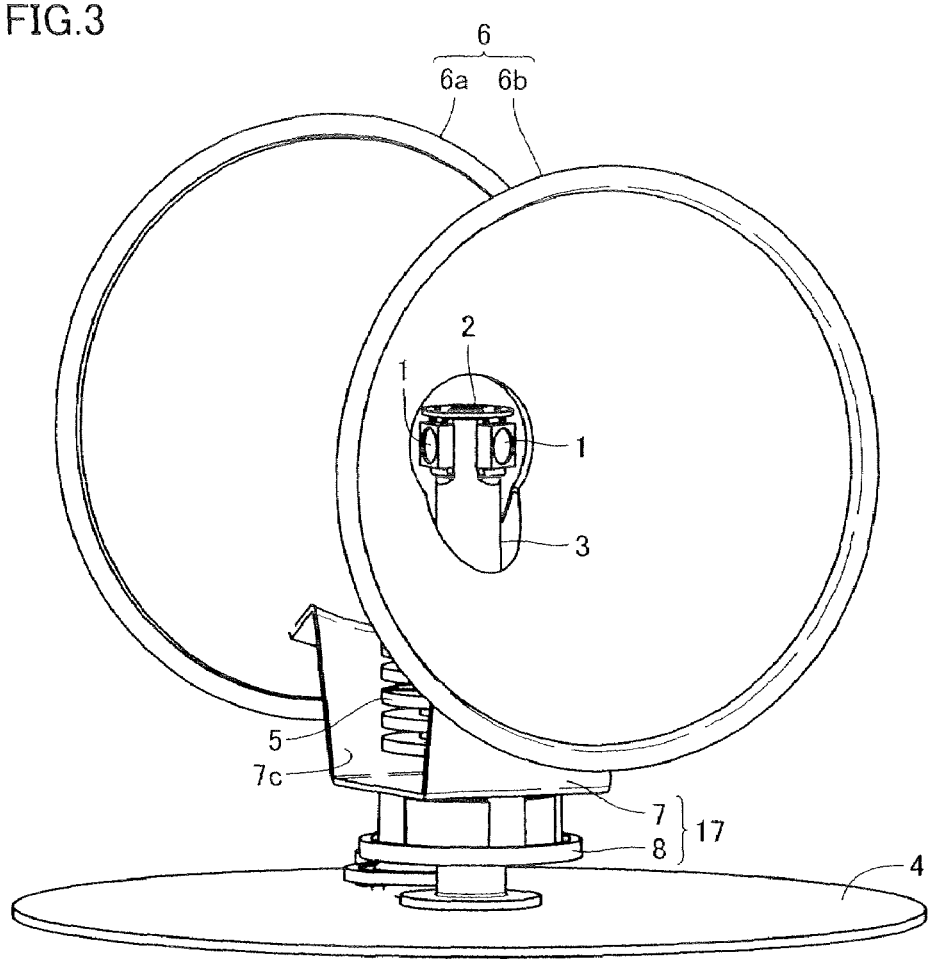
FIG. 3 is a perspective view showing a reflecting mirror, a shaft portion and a chassis of the rotating lamp according to the first embodiment of the present invention.

FIG. 3 is a perspective view showing the reflecting mirror 6, the shaft portion 3 and the chassis 4. As shown in FIG. 3, the reflecting mirror mounting portion 7 is open upward, and formed with a communicating port 7c on its side surface. Therefore, air can be externally supplied to the heat radiating portion 5 arranged inside the reflecting mirror mounting portion 6 through the communicating port 7c, for cooling the heat radiating portion 5. The reflecting mirror mounting portion 7 and the heat radiating portion 5 are arranged between the enlarged diametral parts 6a and 6b outside the reflecting mirror 6. Therefore, the heat radiating portion 5 and the reflecting mirror mounting portion 7 do not inhibit progress of light emitted from the LED devices 1 arranged inside the reflecting mirror 6 and reflected light thereof.

Figure 4:
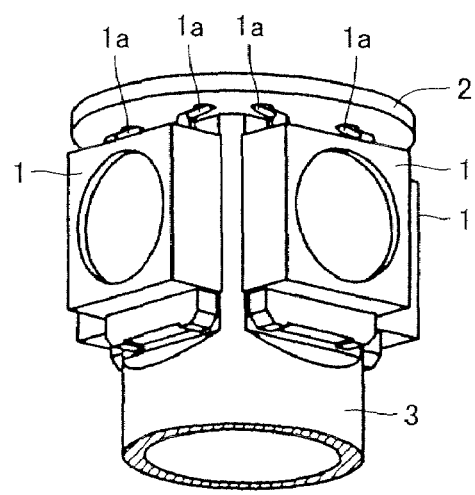
FIG. 4 is an enlarged view showing the forward end of the shaft portion of the rotating lamp according to the first embodiment of the present invention.

FIG. 4 is an enlarged view showing the forward end of the shaft portion 3. As shown in FIG. 4, the upper end surface of the shaft portion 3 is flattened so that the discoidal printed board 2 is set thereon. On the outer peripheral surface of the shaft portion 3 around the upper end thereof, the plurality of LED devices 1 are arranged along the circumferential direction of the shaft portion 3 at regular intervals. The wires 1a are provided between the LED devices 1 and the printed board 2, so that current can be supplied from the printed board 2 to the LED devices 1 through the wires 1a.

Figure 5A:
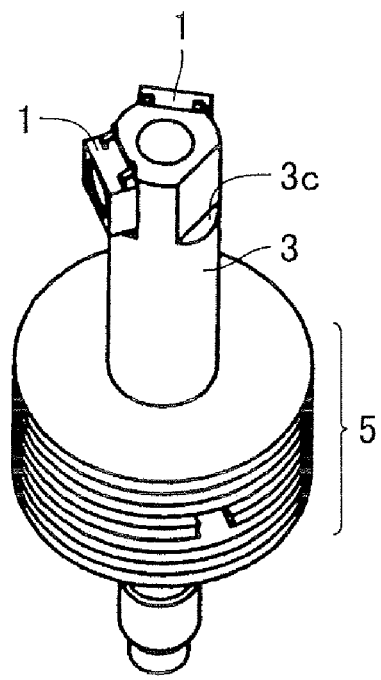
FIG. 5A is a perspective view showing the forward end of the shaft portion of the rotating lamp according to the first embodiment of the present invention.
Figure 5B:
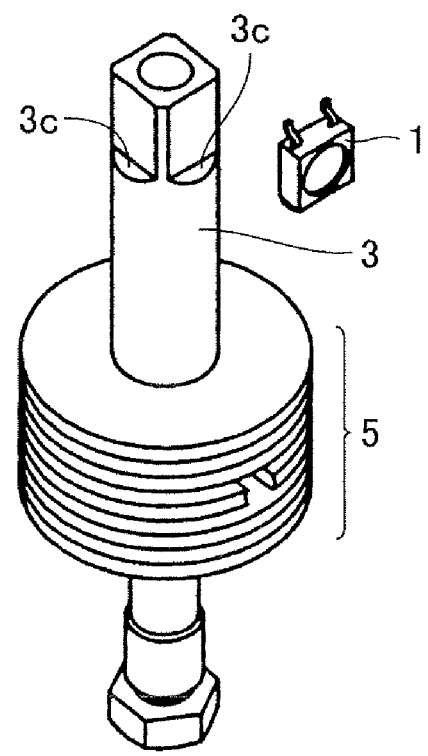
FIG. 5B is a perspective view showing a modification of the forward end of the shaft portion of the rotating lamp according to the first embodiment of the present invention.

FIGS. 5A and 5B are perspective views showing exemplary shapes of the forward end of the shaft portion 3. Referring to FIG. 5A, the shaft portion 3 is formed on its forward end with three recesses 3c along the circumferential direction, for setting the substantially cuboid LED devices 1 therein respectively.

While FIG. 5A shows the LED devices 1 set on three portions along the circumferential direction of the forward end of the shaft portion 3, the number of the LED devices 1 is not restricted to three. For example, four LED devices 1 may be set on the forward end of the shaft portion 3 by forming four recesses 3c along the circumferential direction of the shaft portion 3 and mounting the LED devices 1 on these recesses 3c respectively, as shown in FIG. 5B. The number of the LED devices 1 may be properly selected in response to the radiation angle of the light emitted from the LED devices 1 etc.

Figure 6:
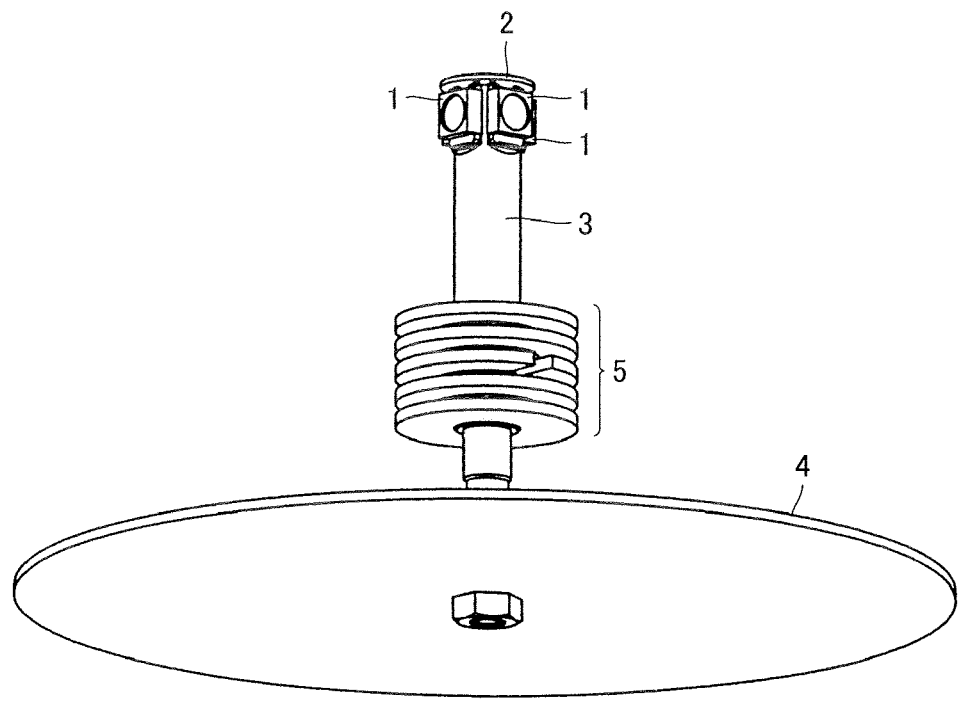
FIG. 6 is a perspective view showing a printed board, the shaft portion, the chassis and a heat radiating portion of the rotating lamp according to the first embodiment of the present invention.

FIG. 6 is a perspective view showing the printed board 2, the shaft portion 3, the heat radiating portion 5 and the chassis 4. As shown in FIG. 6, all of the printed board 2, the heat radiating portion 5 and the chassis 4 are fixed to the shaft portion 3. In other words, the printed board 2, the heat radiating portion 5 and the chassis 4 are integrally coupled with each other through the shaft portion 3.

When the shaft portion 3, the chassis 4, the printed board 2 and the heat radiating portion 5 are made of a material having a high heat transfer coefficient such as metal, heat generated in the LED devices 1 can be transmitted to the respective elements through the shaft portion 3, to be efficiently dissipated to the periphery. The printed board 2, the shaft portion 3, the chassis 4 and the heat radiating portion 5 are preferably mainly composed of aluminum or copper.

Figure 7:
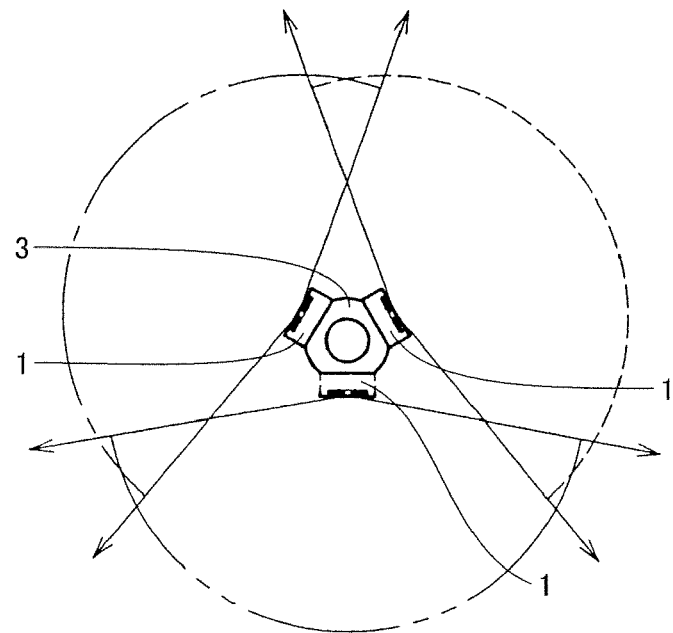
FIG. 7 illustrates the radiation angle of LED devices provided on the upper end of the shaft portion of the rotating lamp according to the first embodiment of the present invention.

FIG. 7 illustrates the state of light emission from the LED devices 1 provided on the upper end of the shaft portion 3.

When the three LED devices 1 are set along the circumferential direction of the shaft portion 3 at regular intervals, beams emitted from the LED devices 1, each having a radiation angle of about 170°, overlap with each other on regions separated from the LED devices 1 by a certain distance.

Consequently, the rotating lamp 50 radiates the beams emitted from the LED devices 1 over the range of 360° along the circumferential direction of the shaft portion 3.

Figure 8:
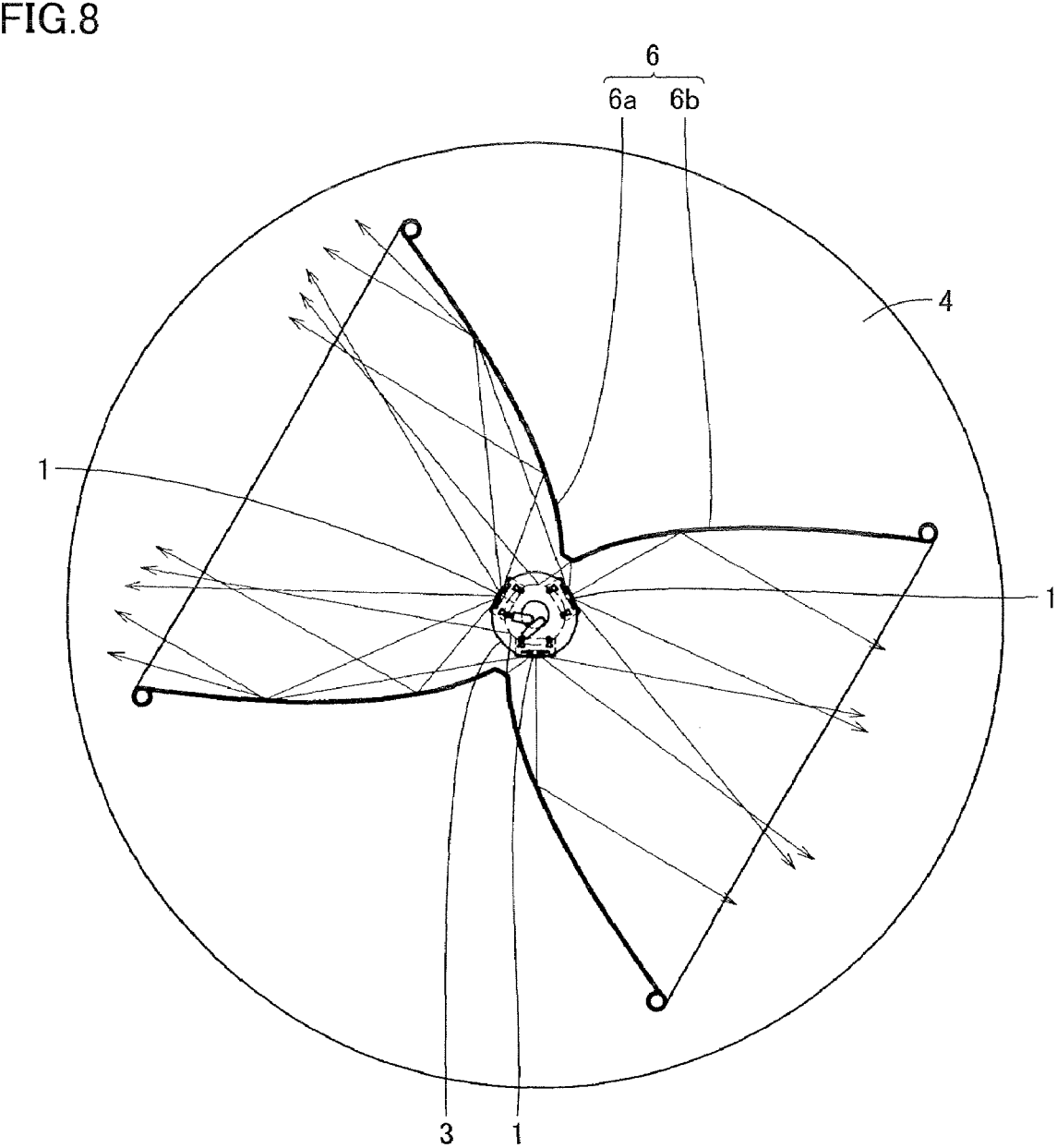
FIG. 8 is a sectional view taken along the line VIII-VIII in FIG. 1.

FIG. 8 is a sectional view taken along the line VIII-VIII in FIG. 1. As shown in FIG. 8, the beams emitted from the LED devices 1 are partially reflected by the inner surface of the reflecting mirror 6 and radiated outward from the opening of the reflecting mirror 6. The LED devices 1 are arranged in the vicinity of the focal point of the reflecting mirror 6 receiving parallel beams, whereby the beams emitted from the LED devices 1 are reflected by the reflecting mirror 6 and radiated outward substantially as parallel beams.

Operations of the rotating lamp 50 according to the first embodiment are now described.

The motor 11 is driven for rotating the pinion 10, thereby rotating the intermediate gear 9 meshing with the pinion 10 and rotating the main gear 8 about the shaft portion 3 along the outer peripheral direction thereof. Following this rotation of the main gear 8, the reflecting mirror mounting portion 7 fixed thereto is also rotated along the outer peripheral direction of the shaft portion 3. Thus, the reflecting mirror 6 can be rotated around the shaft portion 3. At this time, the LED devices 1 emit beams so that the rotating lamp 50 can radiate light outward from the opening of the rotated reflecting mirror 6.

Heat generated by the LED devices 1 emitting the beams is first transferred to the printed board 2 and the shaft portion 3. When the printed board 2 and the shaft portion 3 are made of the material having a high heat transfer coefficient as described above, the heat generated from the LED devices 1 can be efficiently transferred to the elements or spaces around the same through the printed board 2 and the shaft portion 3. More specifically, the rotating lamp 50 can efficiently radiate the heat from the surface of the printed board 2 to the periphery, and efficiently transmit the heat downward through the shaft portion 3 while dissipating the heat from the surface of the shaft portion 3 to the peripheral space. The rotating lamp 50 can radiate the heat transferred to the vertical center of the shaft portion 3 to the peripheral space through the heat radiating portion 5.

The surface area of the heat radiating portion 5 can be increased due to the plurality of radiation fins 5a provided thereon as shown in FIG. 1 etc. Thus, the contact area between the ambient air and the heat radiating portion 5 can be increased for efficiently discharging the heat outward. When this heat radiating portion 5 is made of a material having a high heat transfer coefficient, the rotating lamp 50 can further efficiently radiate the heat to the peripheral space.

The ambient air can be introduced into the heat radiating portion 5 through the communicating port 7c formed on the side surface of the reflecting mirror mounting portion 7. This can also contribute to improvement of the radiation properties of the heat radiating portion 5.

The chassis 4 is arranged on the lower end of the shaft portion 3 so that heat transferred to the lower end of the shaft portion 3 can be discharged into the body casing 13 through the chassis 4. The chassis 4, having a relatively large diameter for covering the opening 12a of the globe 12, can efficiently dissipate the heat to the periphery due to a large contact area with the ambient air. When also made of the material having a high heat transfer coefficient, the chassis 4 can further efficiently dissipate the heat to the periphery.

As hereinabove described, the rotating lamp 50 according to the first embodiment, capable of efficiently discharge the heat generated in the LED devices 1 to the periphery, can effectively inhibit the LED devices 1 from reaching a high temperature and solve a problem resulting from heat. More specifically, the lives of the LED devices 1 can be increased.

When made of aluminum or an aluminum alloy, the shaft portion 3 can be reduced in weight while ensuring the heat radiating function and rigidity. Further, the heat radiating portion 5, arranged on the position around the reflecting mirror 6 not exposed to the light from the LED devices 1 and the reflected light, can ensure the heat radiating function without damaging the original function of the rotating lamp 50.

Second Embodiment

A rotating lamp according to a second embodiment of the present invention is now described with reference to FIGS. 9 to 12. The rotating lamp according to the second embodiment is different from the aforementioned rotating lamp according to the first embodiment mainly in shapes of a reflecting mirror and a rotatable support member. The remaining structure of the second embodiment is basically similar to that of the first embodiment.

Figure 9:
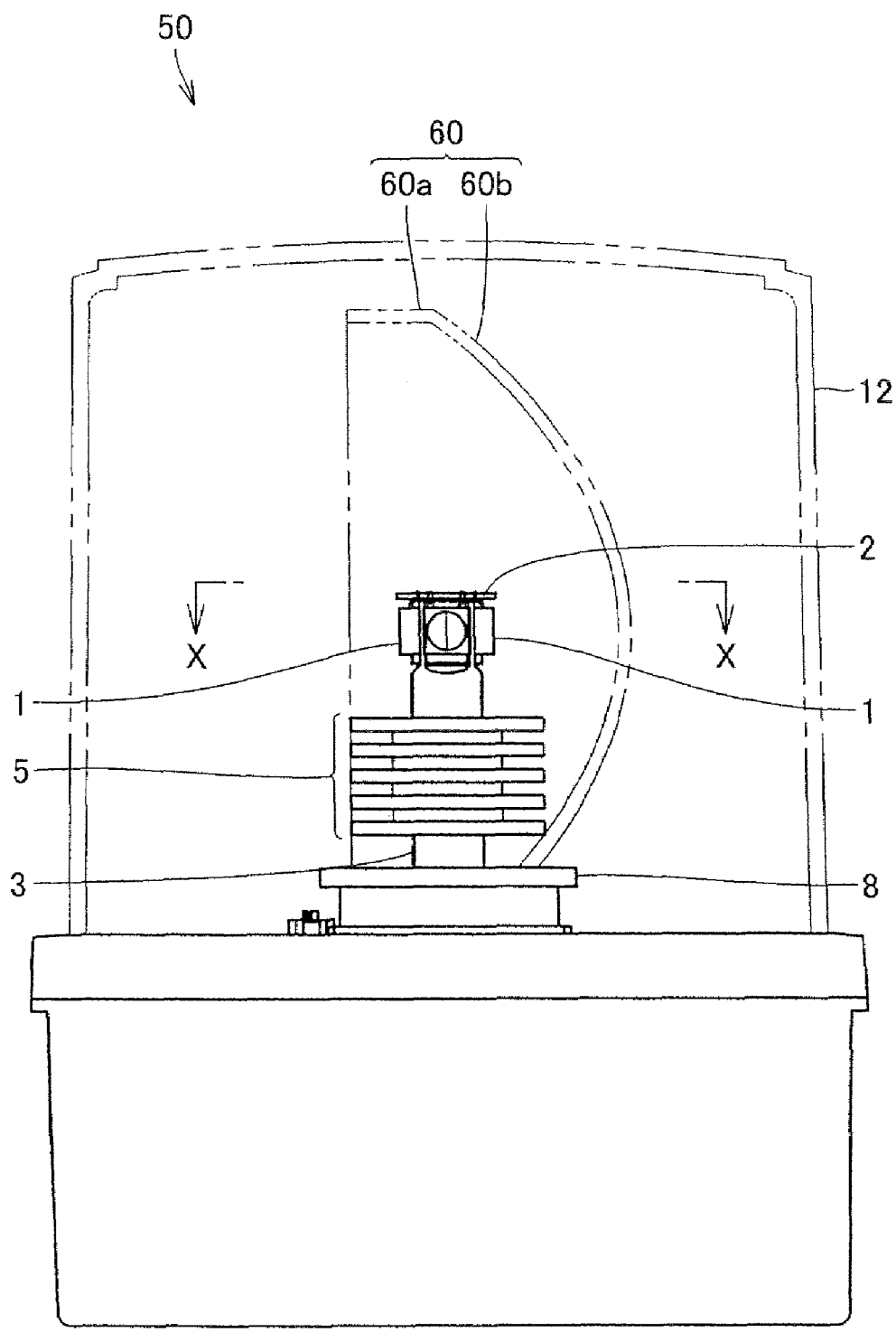
FIG. 9 is a side elevational view of a rotating lamp according to a second embodiment of the present invention.

FIG. 9 is a side elevational view of the rotating lamp 50 according to the second embodiment. FIG. 9 shows the reflecting mirror 60 and a globe 12 with two-dot chain lines.

As shown in FIG. 9, the reflecting mirror 60, arranged around a shaft portion 3, has a substantially curved shape as a whole in the rotating lamp according to the second embodiment. More specifically, the reflecting mirror 60 includes a curved part 60b providing a substantially parabolic reflecting surface opposed to LED devices 1 and a projecting wall 60a formed on the peripheral edge of the curved part 60b to project in the transverse (forward) direction.

A main gear 8 serving as a rotatable support member is arranged on the outer peripheral surface of the base of the shaft portion 3 to be rotatable along the outer peripheral direction of the shaft portion 3. The upper surface of this main gear 8 is flattened. The shaft portion 3 is provided through the main gear 8 to project upward from the center of the upper surface of the main gear 8. The reflecting mirror 60 fixed to this main gear 8 can be rotated around the shaft portion 3 by rotating the main gear 8 around the shaft portion 3. A heat radiating portion 5 and the LED devices 1 are arranged in a region enclosed with the reflecting mirror 60, while the heat radiating portion 5 is arranged downward beyond the LED devices 1.

Figure 10:
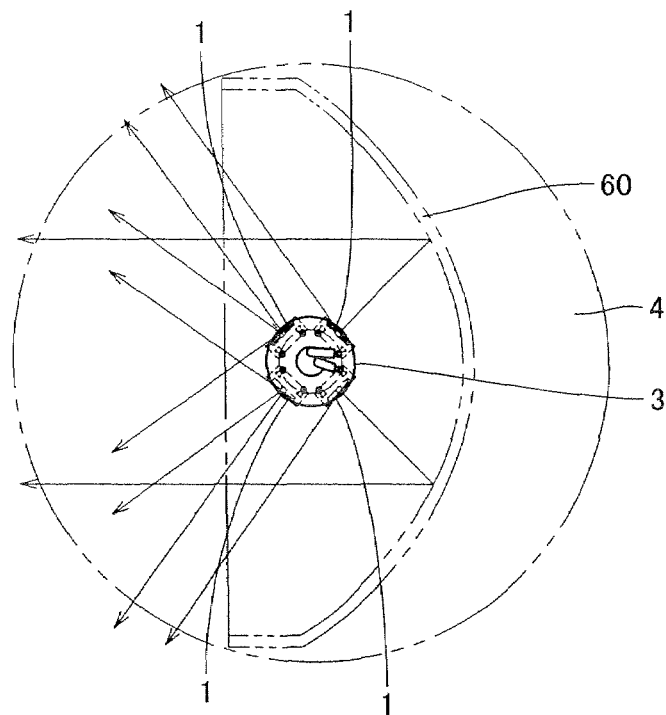
FIG. 10 is a sectional view taken along the line X-X in FIG. 9 for showing radiation characteristics of LED devices.

FIG. 10 is a sectional view taken along the line X-X in FIG. 9. As shown in FIG. 10, the upper end of the shaft portion 3 is arranged on a focal position for light reflected by the reflecting mirror 60 receiving parallel beams. The LED devices 1 are mounted on the upper end of the shaft portion 3 so that light emitted from the LED devices 1 and reflected by the reflecting mirror 60 is radiated outward substantially as parallel beams.

Figure 11:
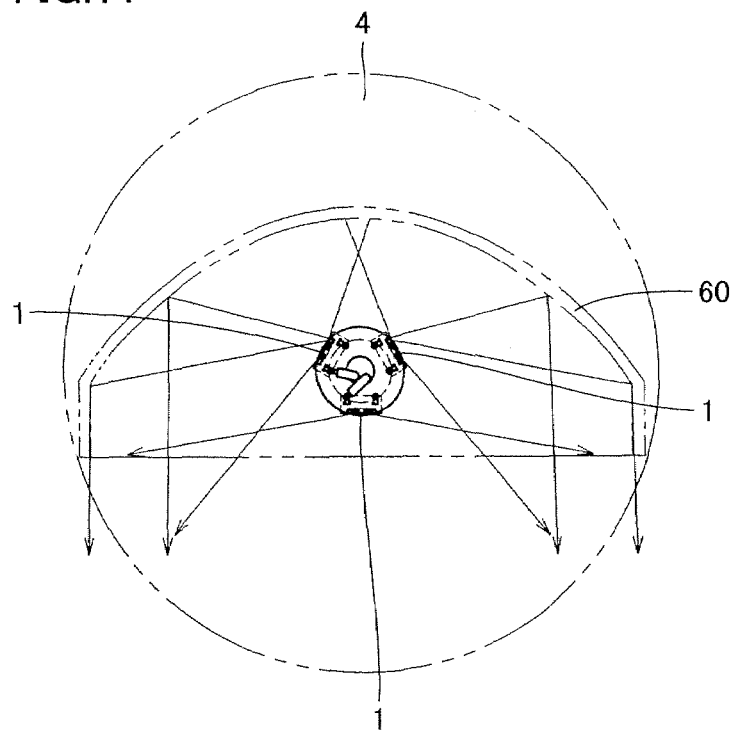
FIG. 11 illustrates radiation characteristics of LED devices in a modification of the rotating lamp according to the second embodiment of the present invention.

FIG. 11 illustrates a modification of the rotating lamp 50 according to the second embodiment. While four LED devices 1 are set along the outer peripheral direction of the shaft portion 3 at regular intervals in the rotating lamp 50 shown in FIG. 10, three LED devices 1 may alternatively be set along the circumferential direction of the shaft portion 3, as shown in FIG. 11. Thus, the number of the LED devices 1 can be properly changed in response to the radiation angle of light emitted from the LED devices 1.

Figure 12:
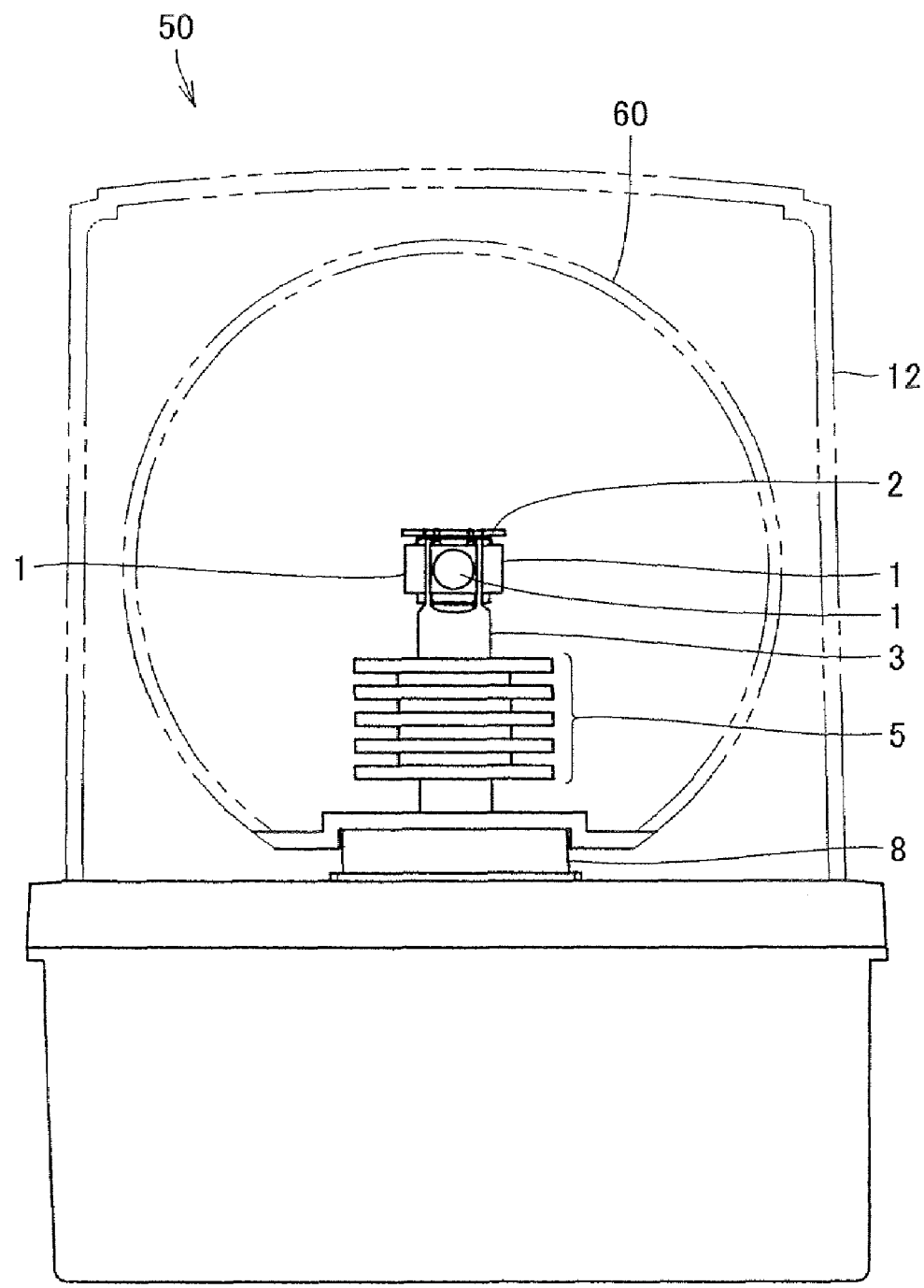
FIG. 12 is a front elevational view of the rotating lamp according to the second embodiment of the present invention.

FIG. 12 is a front elevational view of the rotating lamp 50 according to the second embodiment. FIG. 12 also shows the reflecting mirror 60 and the globe 12 with two-dot chain lines. As shown in FIG. 12, the upper end of the shaft portion 3 is arranged on the center of the reflecting mirror 60, and the plurality of LED devices 1 are mounted on the upper end of the shaft portion 3.

The rotating lamp 50 according to the second embodiment, provided with the heat radiating portion 5 similarly to the aforementioned first embodiment, can efficiently dissipate heat generated in the LED devices 1 to the periphery. When the shaft portion 3, a chassis, a printed board 2 and the heat radiating portion 5 are made of metal or the like having a high heat transfer coefficient similarly to those in the aforementioned first embodiment, the rotating lamp 50 can further efficiently dissipate the heat generated in the LED devices 1 to the periphery.

According to the second embodiment, the reflecting mirror 60 encloses the LED devices 1, whereby the rotating lamp 50 can suppress or reduce radiation of light emitted from the LED devices 1 in a direction (sideward or backward direction, for example) other than the forward direction assuming that the center of the reflecting surface of the reflecting mirror 60 is directed forward. When the reflecting mirror 60 is rotated, therefore, a state where the light emitted from the LED devices 1 and reflected light are blocked by the reflecting mirror 60 itself and substantially or absolutely visually recognizable and a state where the light emitted from the LED devices 1 and the reflected light are clearly visually recognizable alternately appear depending on the position of the reflecting mirror 60, so that the contrast of the light radiated from the rotating lamp 50 can be enhanced.

Third Embodiment

A rotating lamp 50 according to a third embodiment of the present invention is now described with reference to FIGS. 13 and 14.

According to the third embodiment, a heat radiating portion is arranged on a part of a shaft portion upward beyond that mounted with LED devices. The shaft portion typically extends from the bottom to the top of a reflecting mirror, and the heat radiating portion is arranged to reach a region located upward beyond the reflecting mirror. In the shaft portion, the thickness of a region located between a first part mounted with the LED devices and a second part provided with the heat radiating portion is larger than the thickness of another region located downward beyond the aforementioned first part.

Figure 13:
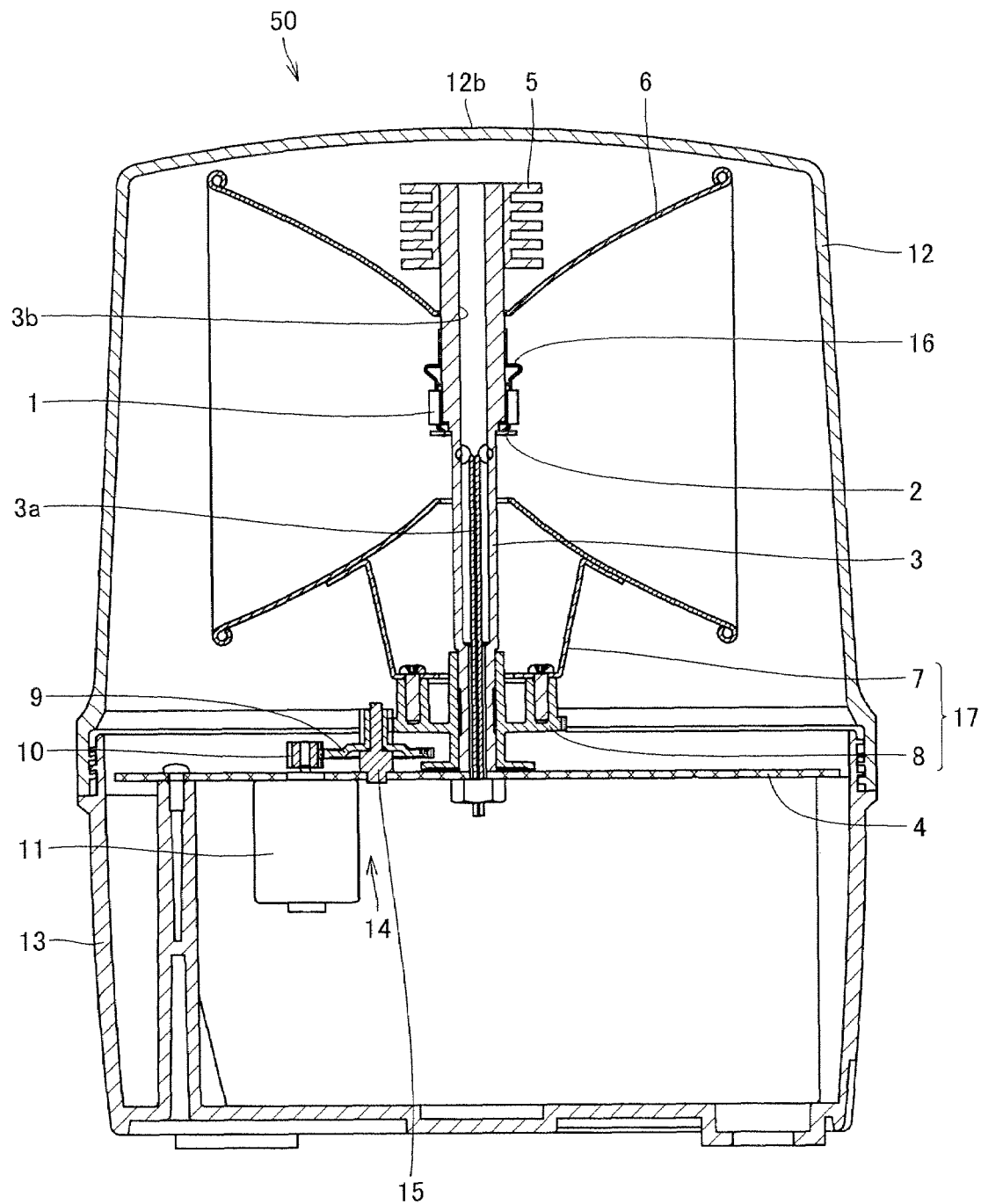
FIG. 13 is a sectional view of a rotating lamp according to a third embodiment of the present invention.

Referring to FIG. 13, the shaft portion 3 passes through the longitudinal center of the reflecting mirror 6 from a region located downward beyond the bottom surface (closer to a reflecting mirror mounting portion 7) of the reflecting mirror 6 to reach a region located upward beyond the upper surface (closer to an upper wall 12b of a globe 12) of the reflecting mirror 6. The shaft portion 3 has a thick part having a relatively large thickness and a thin part having a relatively small thickness, and the LED devices 1 are mounted on the outer periphery of the lower end of the thick part. The LED devices 1 are mounted on the shaft portion 3 through fixtures 16.

While the shaft portion 3 is provided with a large diametral part having a relatively large diameter and a small diametral part having a relatively small diameter which are constituted of the thick part and the thin part respectively in FIG. 13, the shaft portion 3 provided with the thick and thin parts may alternatively have a constant diameter.

Figure 14:
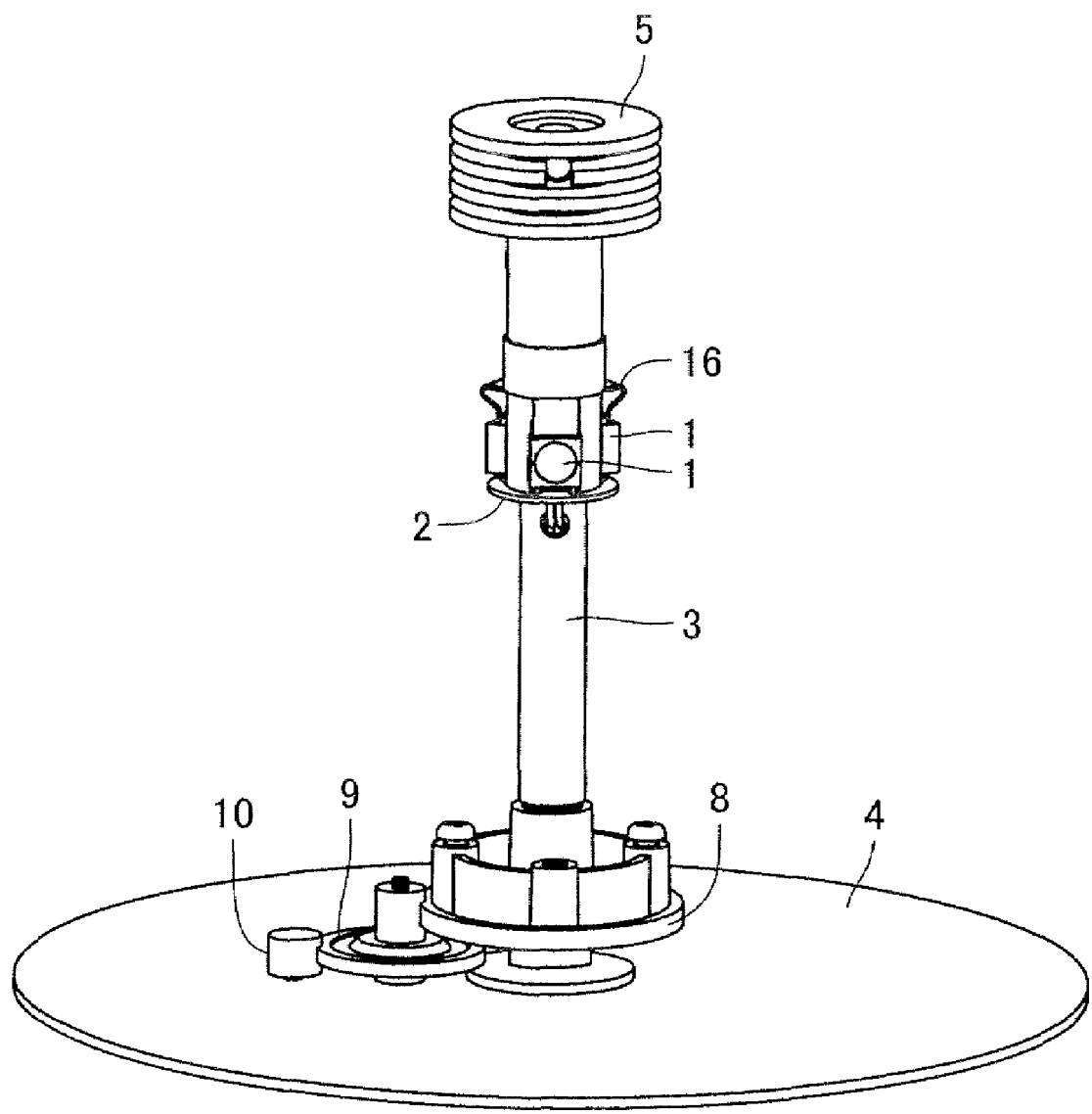
FIG. 14 is a perspective view showing the structure of a part of the rotating lamp according to the third embodiment of the present invention between a heat radiating portion and a chassis.

As shown in FIGS. 13 and 14, the heat radiating portion 5 is arranged on the region of the shaft portion 3 upward beyond the part mounted with the LED devices 1. The quantity of heat transferred to the upper part of the shaft portion 3 is conceivably larger than the quantity of heat transferred to the lower part thereof, and hence the heat radiating portion 5 is arranged on the region of the shaft portion 3 upward beyond the part mounted with the LED devices 1 so that heat generated in the LED devices 1 can be efficiently transferred to the heat radiating portion 5 and dissipated to the periphery through the heat radiating portion 5.

In this case, the LED devices 1 are mounted on the thick part of the shaft portion 3 and the region of the shaft portion 3 located between the parts mounted with the LED devices 1 and the heat radiating portion 5 respectively is constituted of the thick part, so that the heat transfer path between the parts mounted with the LED devices 1 and the heat radiating portion 5 respectively can be extended beyond the downward heat transfer path from the part mounted with the LED devices 1. Thus, the heat can be further efficiently transferred toward the heat radiating portion 5, to be efficiently dissipated to the periphery through the heat radiating portion 5.

The heat radiating portion 5 is arranged between the upper surface of the reflecting mirror 6 and the upper wall 12b of the globe 12. The heat radiating portion 5, mounted on the upper end of the shaft portion 3 according to the third embodiment, may alternatively be set on a position downward beyond the upper end of the shaft portion 3 so far as this position is upward beyond the part mounted with the LED devices 1.

As shown in FIGS. 13 and 14, an annular printed board 2 is set downward beyond the LED devices 1. The LED devices 1 are connected to the printed board 2 through solder or the like. A transverse hole is provided on a part of the shaft portion 3 located downward beyond the printed board 2 for receiving a wire 3a capable of supplying power to the printed board 2 in a through hole 3b of the shaft portion 3 through the transverse hole, so that the wire 3a extends downward through the through hole 3b. The remaining structure of the third embodiment is basically similar to that of the first embodiment.

Fourth Embodiment

A rotating lamp 50 according to a fourth embodiment of the present invention is now described with reference to FIGS. 15 and 16.

According to the fourth embodiment, the rotating lamp 50 has a reflecting mirror 60 having a shape similar to that according to the second embodiment and a shaft portion 3 having a shape similar to that according to the third embodiment.

Figure 15:
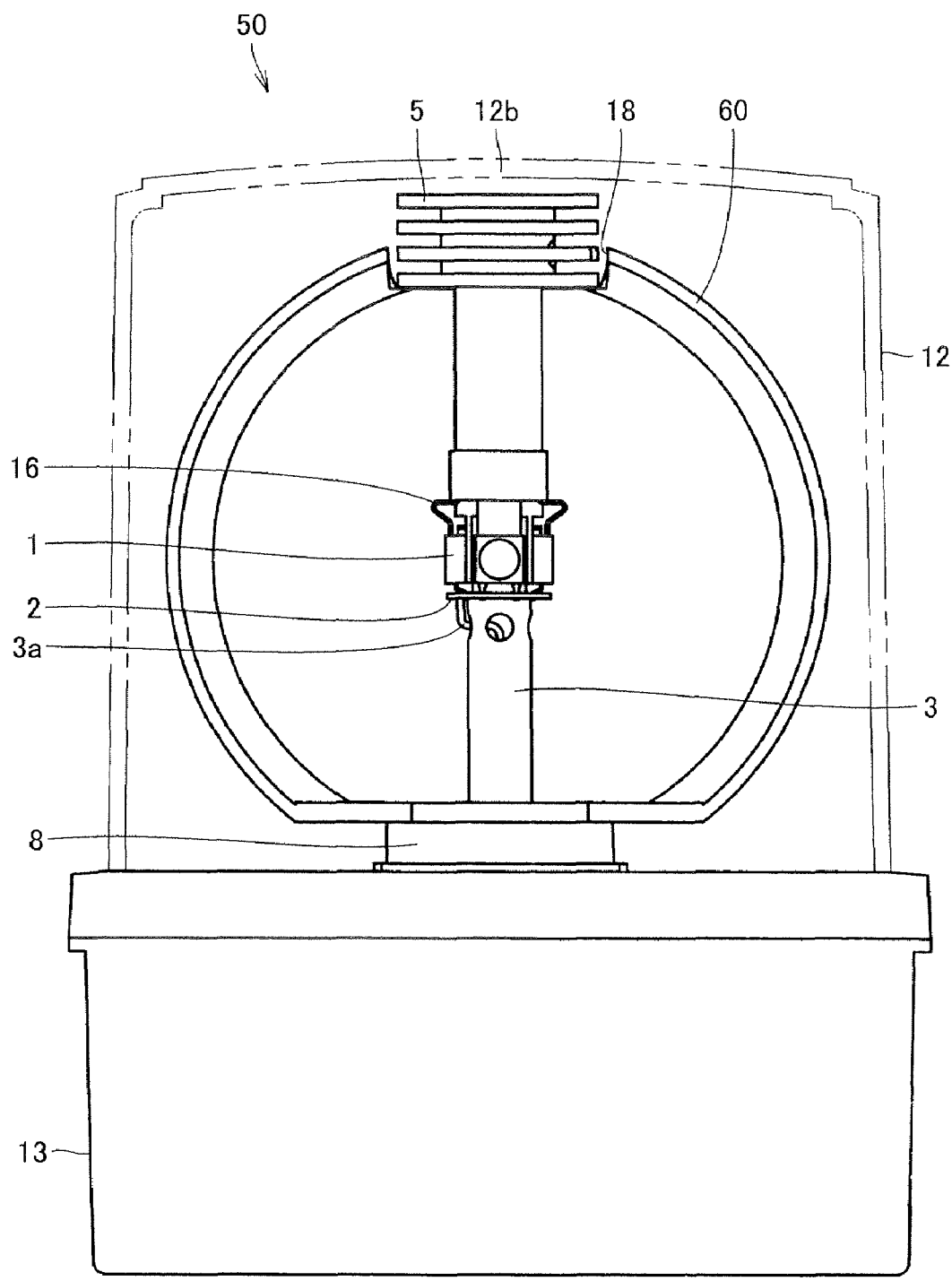
FIG. 15 is a front elevational view of a rotating lamp according to a fourth embodiment of the present invention.

As shown in FIG. 15, the shaft portion 3 is provided to reach a region located upward beyond the upper surface of a reflecting mirror 60 (closer to an upper wall 12b of a globe 12) from another region located downward beyond the bottom surface of the reflecting mirror 60 (surface of a main gear 8) through the front part of a reflecting surface of the reflecting mirror 60. The shaft portion 3 has a thick part having a relatively large thickness and a thin part having a relatively small thickness, so that LED devices 1 are mounted on the outer periphery of the lower end of the thick part. The LED devices 1 are mounted on the shaft portion 3 through fixtures 16.

While the shaft portion 3 is provided with a large diametral part having a relatively large diameter and a small diametral part having a relatively small diameter which are constituted of the thick part and the thin part respectively also in the rotating lamp 50 according to the fourth embodiment as shown in FIG. 15, the shaft portion 3 provided with the thick and thin parts may alternatively have a constant diameter.

Figure 16:
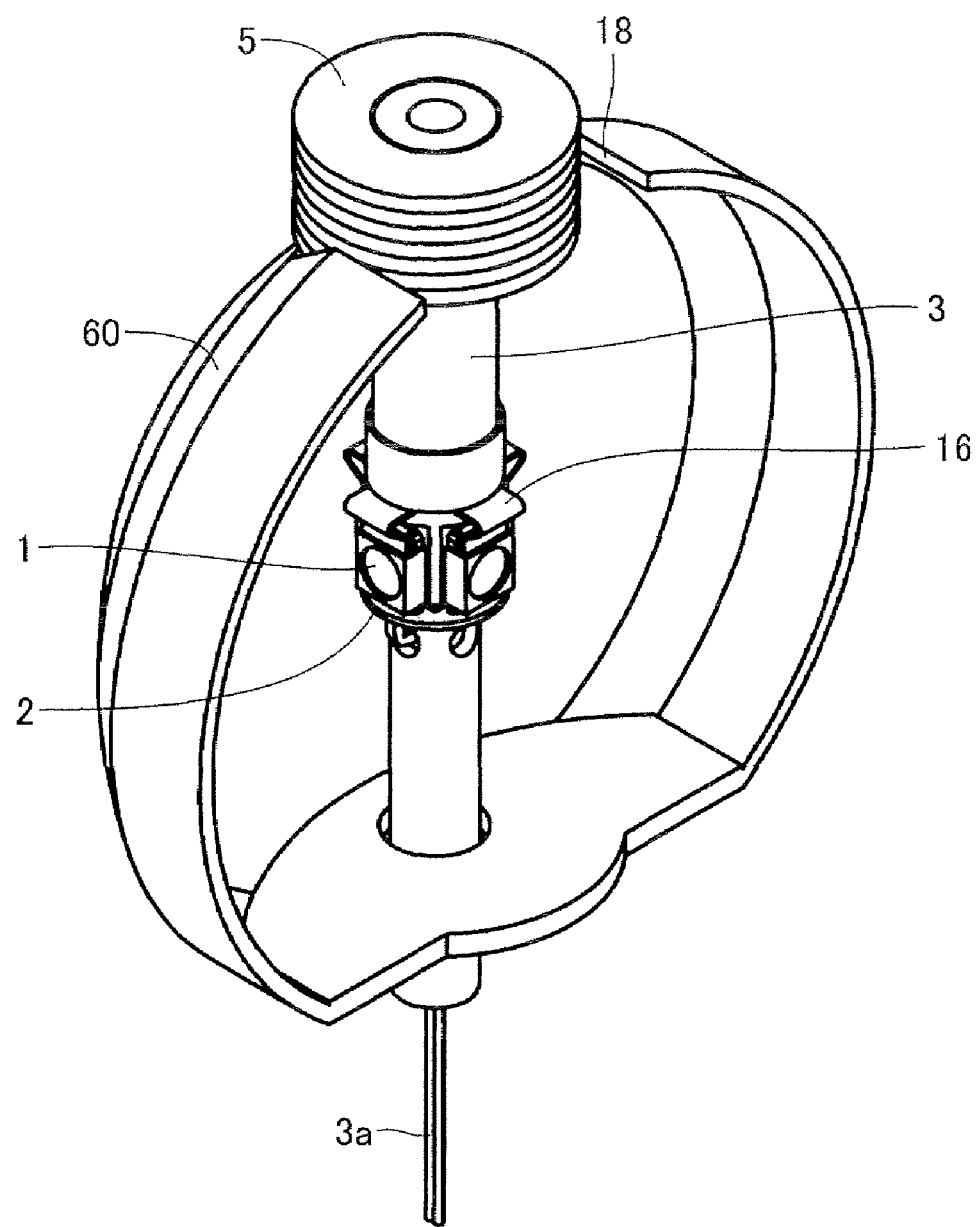
FIG. 16 is a perspective view showing the structure of the rotating lamp according to the fourth embodiment of the present invention around a heat radiating portion, a shaft portion and elements around the same.

As shown in FIGS. 15 and 16, a heat radiating portion 5 is arranged on a region of the shaft portion 3 upward beyond a part mounted with the LED devices 1 also according to the fourth embodiment. Thus, heat generated in the LED devices 1 can be efficiently transferred to the heat radiating portion 5 and dissipated to the periphery through the heat radiating portion 5, similarly to the third embodiment. Further, the LED devices 1 are mounted on the thick part of the shaft portion 3 and the region of the shaft portion 3 located between the parts mounted with the LED devices 1 and the heat radiating portion 5 respectively is constituted of the thick part so that the heat transfer path between the parts mounted with the LED devices 1 and the heat radiating portion 5 respectively can be extended for further efficiently transferring the heat toward the heat radiating portion 5.

As shown in FIG. 15, the heat radiating portion 5 is arranged between the upper surface of the reflecting mirror 60 and the upper wall 12b of the globe 12. According to the fourth embodiment, the reflecting mirror 60 having a forwardly projecting wall is provided with a notch 18 for receiving the heat radiating portion 5 therein. The heat from the heat radiating portion 5 can be dissipated to both of a space enclosed with the reflecting mirror 60 and another space around the reflecting mirror 60 through the notch 18, for efficiently dissipating the heat to the periphery. The remaining structure of the fourth embodiment is basically similar to that of the third embodiment.

Fifth Embodiment

A rotating mirror 50 according to a fifth embodiment of the present invention is now described with reference to FIGS. 17 and 18.

According to the fifth embodiment, a shaft portion (tubular member) mounted with LED devices itself is fixed to an upper side of a globe, and a heat radiating portion is arranged on a region of the shaft portion upward beyond the part mounted with the LED devices. For example, a flange may be provided on an end of the shaft portion to be fixed to the upper wall (ceiling wall) or the side wall of the globe for suspending the shaft portion from the upper part of the globe. The flange and the shaft portion are preferably made of a material containing metal.

Figure 17:
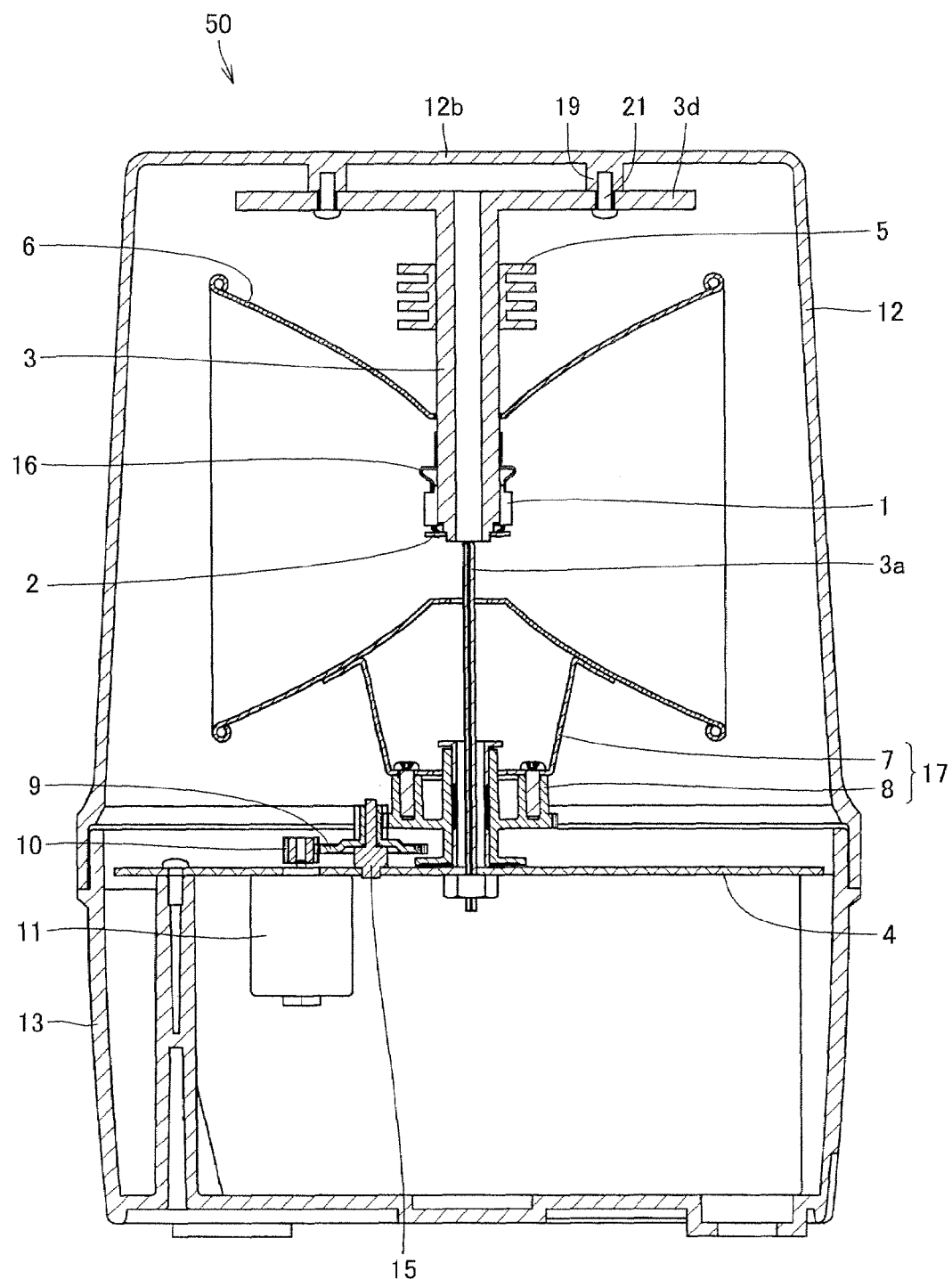
FIG. 17 is a sectional view of a rotating lamp according to a fifth embodiment of the present invention.

Referring to FIG. 17, the flange 3d is provided on the end of the shaft portion 3 and fixed to the upper wall 12b of the globe 12. Support portions (projections: bosses) 19 having threaded holes are provided on the lower surface (inner surface) of the upper wall 12b of the globe 12, and through holes are provided on the flange 3d. The flange 3d can be fixed to the globe 12 by fitting screws 21 to the support portions 19 through the through holes.

Figure 18:
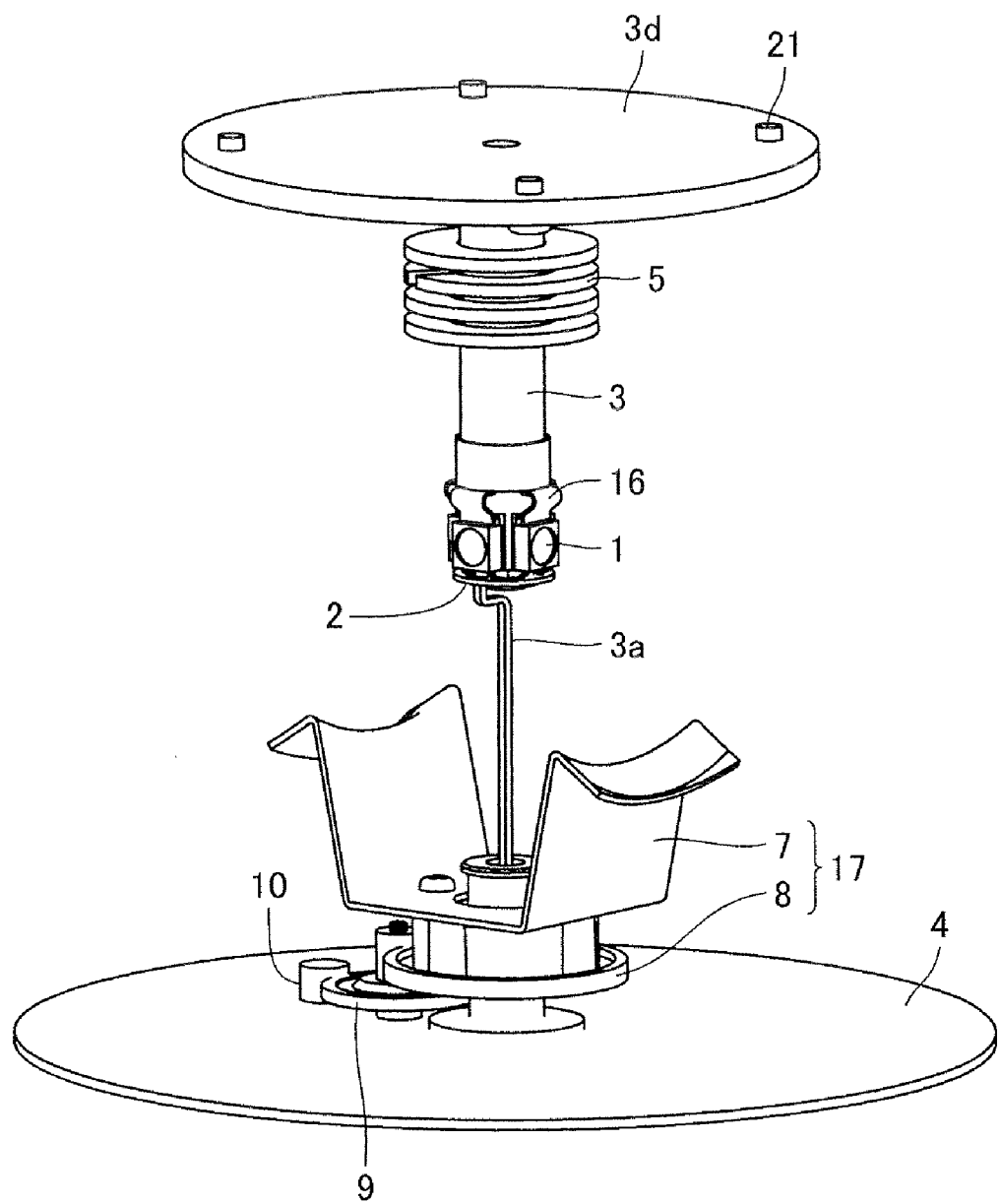
FIG. 18 is a perspective view showing the structure of a part of the rotating lamp according to the fifth embodiment of the present invention between a heat radiating portion and a chassis.

The flange 3d, integrated with the shaft portion 3 in FIGS. 17 and 18, can alternatively be formed by a member independent of the shaft portion 3. Further, the flange 3d may alternatively be fixed to the globe 12 by fixing means other than the screws 21. In addition, the flange 3d may conceivably be fixed to a wall (side wall, for example) of the globe 12 other than the upper wall 12 or a reflecting mirror 6.

As shown in FIG. 17, the heat radiating portion 5 is arranged on a region located between the upper surface of the reflecting mirror 6 and the upper wall 12b of the globe 12. The LED devices 1 are mounted on the lower end of the shaft portion 3, which in turn is set in the globe 12 to extend upward from the part mounted with the LED devices 1. Thus, heat generated in the LED devices 1 can be efficiently transferred to the heat radiating portion 5 and discharged to the periphery through the heat radiating portion 5 due to the shaft portion 3 extending upward from the part mounted with the LED device 1 and the heat radiating portion 5 set upward beyond the part mounted with the LED devices 1. When the shaft portion 3 and the heat radiating portion 5 are made of a material having a high heat transfer coefficient such as that containing metal, the heat can be further efficiently dissipated to the periphery through the heat radiating portion 5.

The flange 3d provided on the end of the shaft portion 3 can also serve as a heat radiating portion. The surface area of the flange 3d, having a substantially discoidal shape in FIGS. 17 and 18, can be increased by enlarging the diameter of the flange 3d, for example. Thus, the heat can be efficiently discharged from the flange 3d to the ambient space.

When the flange 3d is made of a material having a high heat transfer coefficient, the heat can be further efficiently discharged to the ambient space. The surface area of the flange 3d may be increased by roughening the surface of the flange part 3d. If the flange 3d can sufficiently dissipate the heat, the heat radiating portion 5 can be omitted.

As shown in FIGS. 17 and 18, wires 3a supplying power to a printed board 2 extend downward from the lower end of the shaft portion 3 to reach a body casing 13 through a cylindrical portion of a main gear 8. The remaining structure of the fifth embodiment is basically similar to that of the first embodiment.

Sixth Embodiment

A rotating lamp 50 according to a sixth embodiment of the present invention is now described with reference to FIGS. 19 and 20.

The rotating lamp 50 according to the sixth embodiment has a shaft portion 3 and a fixing structure therefore having shapes similar to those according to the fifth embodiment and a reflecting mirror 60 having a shape similar to that according to the fourth embodiment.

Figure 19:
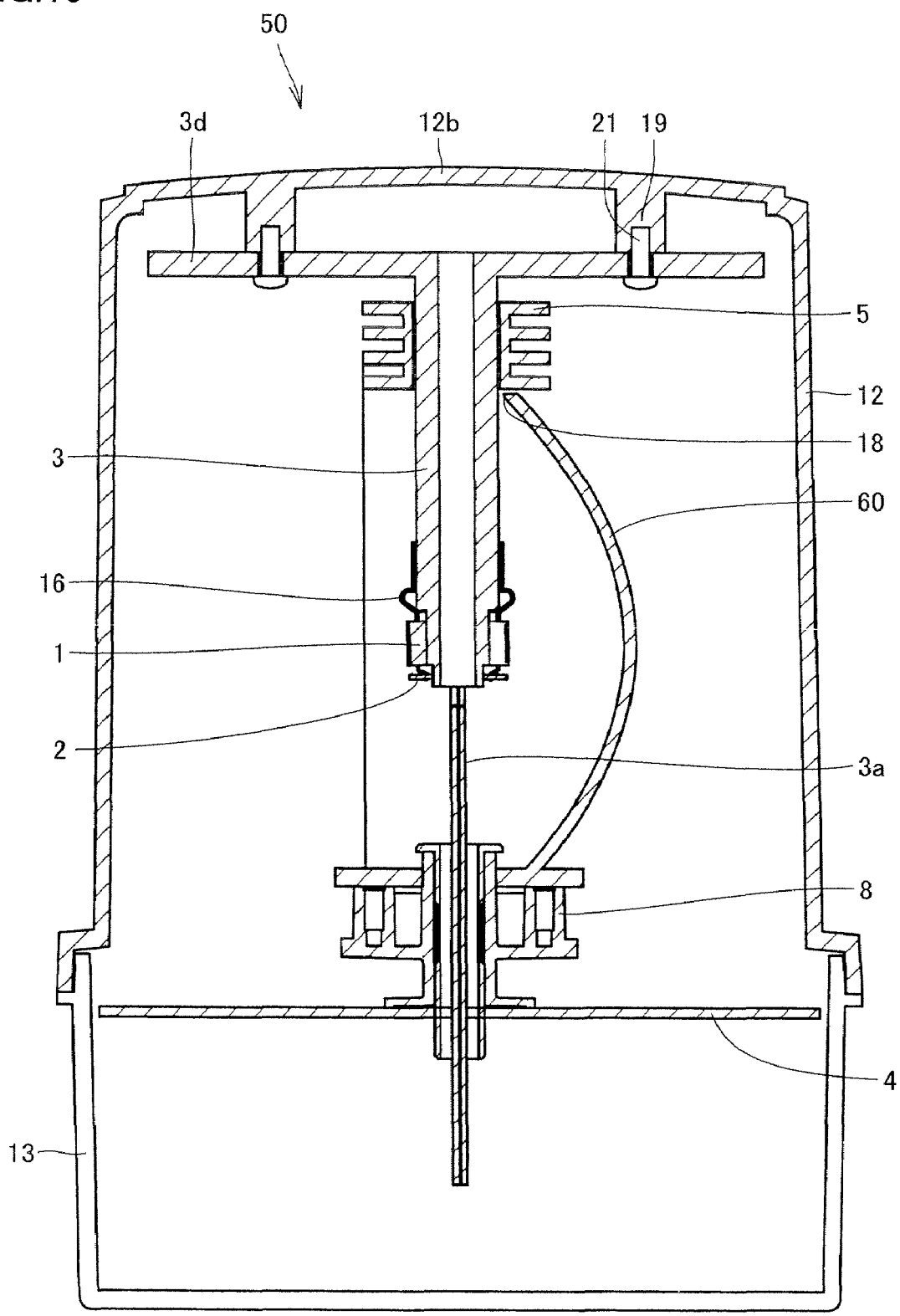
FIG. 19 is a sectional view of a rotating lamp according to a sixth embodiment of the present invention.
Figure 20:
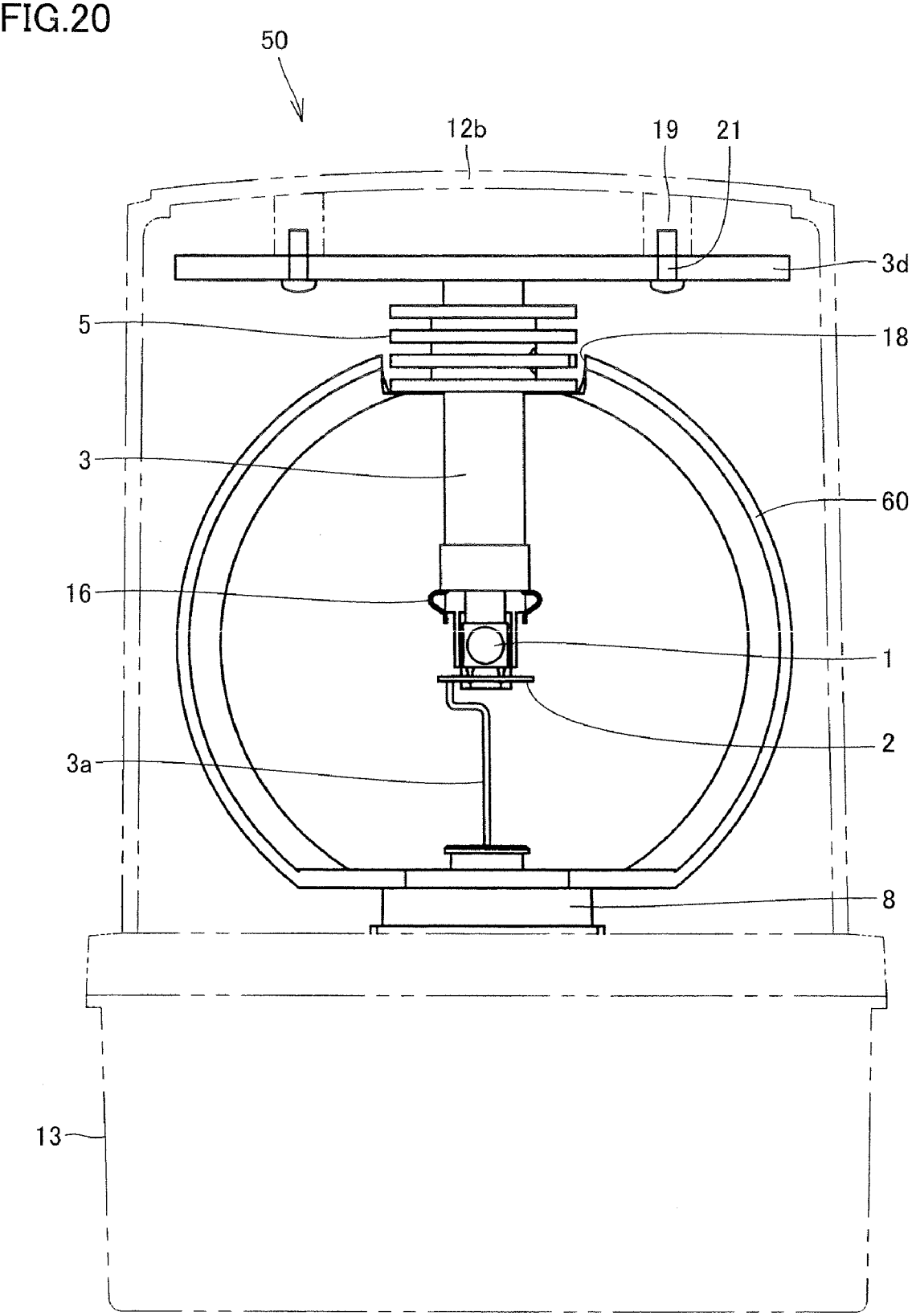
FIG. 20 is a front elevational view of the rotating lamp according to the sixth embodiment of the present invention.

As shown in FIGS. 19 and 20, a flange 3d is provided on an end of the shaft portion 3 to be fixed to an upper wall 12b of a globe 12 according to the sixth embodiment, similarly to the fifth embodiment. A heating portion 5 is arranged on a region between the upper surface of the reflecting mirror 60 and the upper wall 12b of the globe 12. LED devices 1 are mounted on the lower end of the shaft portion 3, which in turn is set in the globe 12 to extend upward from the part mounted with the LED devices 1. Thus, heat generated in the LED devices 1 can be efficiently transferred to the heat radiating portion 5 and efficiently dissipated to the periphery through the heat radiating portion 5, similarly to the fifth embodiment. Further, the heat can be efficiently discharged from the flange 3d provided on the end of the shaft portion 3 to the ambient space for attaining excellent heat radiation similarly to the fifth embodiment.

As shown in FIGS. 19 and 20, wires 3a supplying power to a printed board 2 extend downward from the lower end of the shaft portion 3 to reach a body casing 13 through a cylindrical portion of a main gear 8.

As shown in FIGS. 19 and 20, the heat radiating portion 5 is arranged on a region located between the upper surface of the reflecting mirror 60 and the upper wall 12b of the globe 12, and the reflecting mirror 60 is provided with a notch 18 for receiving the heat radiating portion 5 therein, similarly to the fifth embodiment. Thus, the heat transferred from the heat radiating portion 5 can be dissipated to both of a space enclosed with the reflecting mirror 60 and another space around the reflecting mirror 60 through the notch 18, for efficiently discharging the heat to the periphery. The remaining structure of the sixth embodiment is basically similar to those of the fourth and fifth embodiments.

It should be understood that the embodiments disclosed herein are illustrative rather than limitative in all aspects. The scope of the present invention is shown not in the foregoing description but in the claims, and all the equivalencies within the scope of the claims and all the modifications within the scope are intended to be embraced herein.

The invention claimed is:

1. A rotating lamp comprising:
   a translucent globe;
   an LED (light-emitting diode) device arranged in said globe for serving as a light source;
   a shaft portion that is made of metal and on which said LED device is set;
   a reflecting mirror rotatably set along the outer peripheral direction of said shaft portion for reflecting light received from said LED device;
   a driving portion rotating/driving said reflecting mirror; and
   a heat radiating portion including a disc-like radiation fin made of metal, said heat radiating portion being provided on said shaft portion.

2. The rotating lamp according to claim 1, further comprising:
   a rotatable support member rotatably set on the outer periphery of said shaft portion for supporting said reflecting mirror, and
   a support plate supporting said rotatable support member and said shaft portion, wherein
   said shaft portion and said support plate are made of a material containing metal.

3. The rotating lamp according to claim 1, wherein said heat radiating portion is arranged upward beyond a part of said shaft portion mounted with said LED device.

4. The rotating lamp according to claim 3, wherein the thickness of a region of said shaft portion located between a first part mounted with said LED device and a second part provided with said heat radiating portion is larger than the thickness of another region of said shaft portion located downward beyond said first part.

5. The rotating lamp according to claim 1, wherein said shaft portion extends from the bottom to the top of said reflecting mirror, and
   said heat radiating portion is arranged to reach a region located upward beyond said reflecting mirror.

6. The rotating lamp according to claim 1, wherein said reflecting mirror is provided with a notch for receiving said heat radiating portion in said notch.

7. The rotating lamp according to claim 1, wherein said shaft portion is hollowed for storing a lead wire supplying power to said LED device in said shaft portion.

8. The rotating lamp according to claim 1, wherein
   said shaft portion has a flange on one end thereof,
   said flange is fixed to the upper wall of said globe, and
   said heat radiating portion is arranged upward beyond a part of said shaft portion mounted with said LED device.

9. The rotating lamp according to claim 8, wherein said flange and said shaft portion are made of a material containing metal.

10. The rotating lamp according to claim 1, wherein said heat radiating portion has a plurality of radiation fins set on the outer periphery of said shaft portion to radially extend outward from said shaft portion.

11. A rotating lamp comprising:
    a translucent globe;
    an LED (light-emitting diode) device arranged in said globe for serving as a light source;
    a shaft portion on which said LED device is set;
    a reflecting mirror rotatably set along the outer peripheral direction of said shaft portion for reflecting light received from said LED device;
    a driving portion rotating/driving said reflecting mirror; and
    a heat radiating portion provided on said shaft portion, wherein
    said shaft portion has a flange on one end thereof,
    said flange is fixed to the upper wall of said globe, and
    said heat radiating portion is arranged upward beyond a part of said shaft portion mounted with said LED device.

12. The rotating lamp according to claim 11, wherein said flange and said shaft portion are made of a material containing metal.

* * * * *